United States Patent
Kawamura et al.

(10) Patent No.: US 6,815,025 B2
(45) Date of Patent: Nov. 9, 2004

(54) PEELABLE FILM FOR A MEDICAL PACKAGING CONTAINER

(75) Inventors: Shin-ichi Kawamura, Osaka (JP); Hiroshi Fukushima, Osaka (JP)

(73) Assignee: Nipro Corporation, Osaka (JP)

( * ) Notice: Subject to any disclaimer, the term of this patent is extended or adjusted under 35 U.S.C. 154(b) by 0 days.

(21) Appl. No.: 10/782,792

(22) Filed: Feb. 23, 2004

(65) Prior Publication Data

US 2004/0161561 A1 Aug. 19, 2004

Related U.S. Application Data

(60) Division of application No. 10/367,818, filed on Feb. 19, 2003, now abandoned, which is a continuation-in-part of application No. 09/731,781, filed on Dec. 8, 2000, now Pat. No. 6,720,045.

(30) Foreign Application Priority Data

Dec. 8, 1999 (JP) .......................................... 11-349509

(51) Int. Cl.⁷ ................................................ B32B 1/08
(52) U.S. Cl. .................. 428/36.9; 428/36.92; 428/35.5; 428/35.2; 428/34.3; 428/35.7; 428/212; 428/219; 428/516
(58) Field of Search ............................. 428/36.9, 36.92, 428/35.5, 35.2, 34.3, 35.7, 212, 219, 516

(56) References Cited

U.S. PATENT DOCUMENTS

| | | | |
|---|---|---|---|
| 5,478,617 A | 12/1995 | Watanabe et al. | 428/35.2 |
| 5,501,887 A | 3/1996 | Tanaka et al. | 428/35.2 |
| 5,837,369 A | 11/1998 | Grünberger et al. | 428/349 |
| 5,928,740 A * | 7/1999 | Wilhoit et al. | 428/34.9 |
| 5,997,968 A * | 12/1999 | Dries et al. | 428/35.7 |
| 6,010,772 A * | 1/2000 | Perdomi et al. | 428/212 |

FOREIGN PATENT DOCUMENTS

| | | |
|---|---|---|
| DE | 196 13 959 A1 | 10/1997 |
| EP | 0 353 613 A | 2/1990 |
| JP | 07-136234 | 5/1995 |
| JP | 08-131515 | 5/1996 |
| JP | 08-229099 | 9/1996 |
| JP | 08-229100 | 9/1996 |
| JP | 8-244182 A | 9/1996 |
| JP | 9-216640 A | 8/1997 |
| JP | 9-216664 A | 8/1997 |
| JP | 9-267454 A | 10/1997 |
| JP | 10-314275 | 12/1998 |
| JP | 2000-005276 | 1/2000 |

\* cited by examiner

Primary Examiner—Alexander S. Thomas
Assistant Examiner—Jane Rhee
(74) Attorney, Agent, or Firm—Kubovcik & Kubovcik

(57) ABSTRACT

An easily peelable film comprising a mixture of a propylene/α-olefin copolymer (A), a propylene/α-olefin copolymer (B) having an α-olefin content different from that of the copolymer (A), and/or a propylene homopolymer (C). The easily peelable film has excellent heat resistance, flexibility, and transparency and further a broad temperature range for low temperature welding at which peelable partition walls can be formed.

8 Claims, No Drawings

PEELABLE FILM FOR A MEDICAL PACKAGING CONTAINER

This application is a division of application Ser. No. 10/367,818, filed Feb. 19, 2003 abandoned, which is a continuation of application Ser. No. 09/731,781, filed Dec. 8, 2000 now U.S. Pat. No. 6,720,045.

FIELD OF THE INVENTION

The present invention relates to films showing excellent easy peelability when the films are sealed to each other and medical packaging containers using the films as an inner layer.

Herein, the term "easy peelability" means that the following two portions can be formed selectively from one material. They are a strongly heat welded portion that can be sealed by heating two members of one material at a relatively high temperature and cannot be substantially peeled, and a weakly heat welded portion that can be sealed by heating the members of the material at a relatively low temperature (hereinafter referred to as low temperature welding) and can be easily peeled.

BACKGROUND OF THE INVENTION

Hitherto, there have been known lid materials and packaging materials provided with an adhesive surface that can be easily peeled to facilitate unsealing as well as medical multi-chamber containers partitioned with easily peelable partition walls.

Medical multi-chamber containers are used for applications such as the aseptical mixing, immediately before use, of drugs or chemical solutions that tend to be denatured or to have decreased preservative qualities when they are in a mixed state. That is, the contents are preserved in a container separately in a plurality of chambers partitioned by partition walls that can be easily peeled. The container is compressed by hand immediately before use so as to have the chambers communicate with each other and have the contents aseptically mix.

The multi-chamber container is usually formed of a single layer film having easy peelability mentioned above or formed of a multi-layer film obtained by laminating the film having easy peelability as an inner layer. First, a peripheral portion of superposed films is heat welded at a relatively high temperature to form a container. Then, an intermediate portion of the formed container is heat welded at a relatively low temperature from outside of the container using a heating mold in order to form easily peelable partition walls and partition the container into a plurality of chambers. Where the multi-chamber container is formed of a resin that does not show easy peelability, the partition walls in the multi-chamber container can be formed by inserting an easily peelable film (usually, a film made of a mixture of the resin used for the film for forming the container and a resin incompatible therewith) between partition wall portions and heat welding the partition wall portions together.

The easily peelable film used for the medical container must satisfy heat resistance, transparency, flexibility and impact resistance requirements as well as medical safety requirements and disposability and thus far many proposals have been made.

For example, there have been known easily peelable films made of mixtures of polypropylene type polymers and ethylene/α-olefin type elastomers (JP-A-Hei 7-136234 and JP-A-Hei 8-131515) and films made of mixtures of polypropylene type polymers or polyethylene type polymers as a major component and styrene type elastomers (JP-A-Hei 8-229099 and JP-A-Hei 8-229100). However, these films contain a large content of the α-olefin or the elastomer so that they have poor heat resistance and an increased change or fluctuation in peel strength of the formed partition walls, allowing high pressure steam sterilization to be performed only at 115° C. or less.

On the other hand, easily peelable films made of resin compositions containing polyolefin type resins and incompatible resins such as polymethylpentene type resins having excellent heat resistance (JP-B-Hei 7-96283) have blended therein a significant amount of incompatible resins so that they are poor in transparency and flexibility, and are unsuitable as medical containers.

Furthermore, a bag using a copolymer comprising an homogeneous phase of propylene for internal partition walls is also known (JP-A-Hei 10-314275). The copolymer comprising an homogeneous phase of propylene preferably has a melting point of 150–160° C. and contains about 3% by weight of an ethylene component. However, although a bag made of the copolymer is excellent in heat resistance, a temperature range for low temperature welding at which peelable partition walls can be formed is as narrow as 137.5°±1° C., so that it is difficult to form partition walls.

SUMMARY OF THE INVENTION

The present invention has been made in view of the above circumstances and an object of the present invention is to provide an easily peelable film that has excellent heat resistance, flexibility, and transparency and further has a broad temperature range for low temperature welding at which peelable partition walls can be formed, and a medical packaging container using the above-mentioned film.

The present inventors have made intensive research to achieve the above object and have discovered that use of a mixture of two or more propylene polymers having different melting points can attain the above object, thus achieving the present invention.

That is, the present invention relates to an easily peelable film comprising a mixture of a propylene/α-olefin copolymer (A) and a propylene/α-olefin copolymer (B) having an α-olefin content different from that of the copolymer (A), and/or a propylene homopolymer (C).

Also, the present invention relates to an easily peelable laminated film using the above-mentioned film as a surface layer film.

Furthermore, the present invention relates to a medical packaging container using the easily peelable film or easily peelable laminated film.

The propylene/α-olefin copolymer (A) according to the present invention has a melting point of 110–130° C., preferably 115–125° C. On the other hand, the propylene/α-olefin copolymer (B) according to the present invention has a melting point of 130–170° C., preferably 135–155° C. The propylene homopolymer (C) according to the present invention has a melting point of 130–170° C., preferably 161–170° C. Where the melting point of (A) is lower than 110° C. or the melting point of (B) or (C) is lower than 130° C., the film or packaging container after molding has poor heat resistance, so that there is a possibility that a decrease in transparency or a deformation of the container after high pressure steam sterilization can occur. Where the melting point of (A) is higher than 130° C., the difference from the melting point of (B) or (C) is small, so that it is difficult to form easily peelable partition walls.

Furthermore, a difference between the melting point of (A) and the melting point of (B) or (C) is preferably at least 5° C. and, more preferably, 7° C. or more. If the difference in melting point is smaller than 5° C., it is difficult to selectively form a strong heat welded portion or a weak heat welded portion.

The melting point referred to herein means a temperature at which a DSC (differential scanning calorimetry) measurement of the copolymer or homopolymer pellets gives a maximum endothermic peak by melting.

The α-olefin content of the propylene/α-olefin copolymer (A) is 5–20 mol % and, preferably 7–15 mol %. The α-olefin content of the propylene/α-olefin copolymer (B) is 8 mol % or less and, preferably, 7 mol % or less. If the α-olefin content of the propylene/α-olefin copolymer (A) is higher than 20 mol %, not only are the heat resistance and transparency decreased but also, the peel strength increases when easily peelable partition walls are prepared, so that it is difficult to release the partition walls by hand.

The mixture that forms the easily peelable film according to the present invention may be a mixture of three components, i.e., the propylene/α-olefin copolymer (A), propylene/α-olefin copolymer (B), and the propylene homopolymer (C) or a mixture of two components, i.e., (A) and (B) or (A) and (C). Copolymer (A) may be two or more propylene/α-olefin copolymers having a melting point of 110–130° C. Copolymer (B) may be two or more propylene/α-olefin copolymers having a melting point of 130–170° C. and propylene homopolymer (C) may be two or more propylene homopolymers.

As the α-olefin of the propylene/α-olefin copolymer (A), α-olefins having 2 or 4–8 carbon atoms and, more specifically, ethylene, butene, pentene, hexene, heptene, octene or two or more of these can be used. That is, specific examples of the propylene/α-olefin copolymer (A) according to the present invention can be, in addition to bipolymers such as propylene/ethylene copolymers, propylene/butene copolymers, and terpolymers such as propylene/ethylene/butene copolymers.

As the α-olefin of the propylene/α-olefin copolymer (B), the same ones as can be used in the propylene/α-olefin copolymer (A) can be used. Where the mixture forming the easily peelable film according to the present invention contains both (A) and (B), the α-olefins of (A) and (B) can be the same as long as their contents are different. If different α-olefins are used, their contents can be the same or different.

In the present invention, it is preferred that the α-olefin in the above (A) or (B) is ethylene and, more preferably, the α-olefin in both of the above (A) and (B) is ethylene.

A film formed of propylene/α-olefin copolymer (A) according to the present invention preferably has a tensile modulus of 2,000–10,000 kg/cm². A film formed of propylene/α-olefin copolymer (B) or propylene homopolymer (C) preferably has a tensile modulus of 3,000–17,000 kg/cm². If the tensile modulus of copolymer (A) is smaller than 2,000 kg/cm² or the tensile modulus of copolymer (B) or (C) is smaller than 3,000 kg/cm², the film prepared from the mixture of copolymer (A) and copolymer (B) and/or homopolymer (C) has insufficient strength and there is a possibility that sticking between the surfaces of two-folded films could occur. If the tensile modulus of copolymer (A) is larger than 10,000 kg/cm² or the tensile modulus of copolymer (B) or (C) is larger than 17,000 kg/cm², there is a possibility that the film prepared from the mixture of copolymer (A) and copolymer (B) and/or homopolymer (C) has insufficient flexibility.

It is preferred that the mixing ratio of the propylene/α-olefin copolymer (A) to the propylene/α-olefin copolymer (B) and/or the propylene homopolymer (C) is 15-85:85-15 by weight. If the amount of propylene/α-olefin copolymer (A) is less than 15% by weight and the amount of propylene/α-olefin copolymer (B) and/or the propylene homopolymer (C) are/is more than 85% by weight, the peel strength of partition walls is too low when the easily peelable partition walls are formed of the prepared film, or the range of welding temperature at which the partition walls are formed is narrow. If the amount of propylene/α-olefin copolymer (A) is more than 85% by weight and the amount of propylene/α-olefin copolymer (B) and/or the propylene homopolymer (C) are/is less than 15% by weight, conversely, the peel strength of the partition walls is too high or there is a possibility that the film becomes sticky.

The easily peelable film according to the present invention can be prepared by a conventional method from a mixture of the propylene/α-olefin copolymer (A) and the propylene/α-olefin copolymer (B) and/or the propylene homopolymer (C). The method of mixing the polymers is not particularly limited but it is preferable that the resin pellets are preliminarily dry blended or that they are melt blended using a double-screw extruder.

At the time of fabrication of the mixture according to the present invention into easily peelable films, conventionally known ingredients such as heat stabilizers, antioxidants, ultraviolet absorbents may be added thereto. A preferred amount of the ingredients added thereto is 0.001–10% by weight based on the mixture. Insofar as the properties of the easily peelable film according to the present invention are not adversely affected, thermoplastic resins such as compatibilizers, lubricants, anti-blocking agents, antistatic agents, pigments, anti-microbial agents, etc. may be added. Known surface treatments such as ozone treatment, corona treatment, vapor deposition treatment, etc. may also be carried out.

The easily peelable film according to the present invention may be a laminated film comprising the easily peelable film as at least one surface layer thereof and a layer of another resin laminated thereon in order to improve the gas barrier property, easy peelability, mechanical properties and the like. The other resin as used herein includes α-olefin type resins such as polypropylene type resins, propylene/α-olefin copolymers, polyethylene type resins, ethylene/α-olefin copolymers, polybutene and the like, cyclic polyolefin type resins, ethylene/vinyl alcohol copolymers, and ethylene/vinyl acetate copolymers as well as thermoplastic resins such as polyamide type resins and polyester type resins, or mixtures of these resins.

The easily peelable film according to the present invention can be produced by methods similar to the molding method used for general thermoplastic resins, such as T-die molding, inflation molding and the like. The easily peelable laminated film can be produced by methods such as co-extrusion molding, dry laminating and extrusive coating.

The easily peelable film obtained by the present invention has a thickness of preferably about 5–500 μm and, more preferably, 2–400 μm. If the film is thinner than 5 μm, the strength of the film is insufficient or it is difficult to form partition walls having excellent easy peelability. If the film is thicker than 500 μm, the flexibility of the film is decreased and welding of the film is difficult.

Furthermore, the easily peelable laminated film according to the present invention has a thickness of 10–500 μm and, preferably 20–400 μm. The ratio of the thickness of the film or films having easy peelability in a laminated film comprising one or more films having easy peelability and one or more films not having easy peelability is 0.05 or more, preferably 0.10 or more, based on the total film thickness. If it is less than 0.5, the peel strength of the easily peelable partition walls formed of the film decreases.

The easily peelable film or easily peelable laminated film according to the present invention may be used as it is as a lid material for an easily peelable container, a sealing film for rubber stopper caps of an infusion bag or may be molded into medical packaging containers having easily peelable partition walls. Although the packaging containers can be molded by heat welding the film, they can also be produced directly from the above mixtures by blow molding, vacuum forming or like methods. The packaging containers include multi-chamber containers, blister packs, etc.

Among the medical packaging containers according to the present invention, for example, multi-chamber containers can be obtained by welding the central portion of a tubular film obtained by inflation molding at a low temperature to form two chambers partitioned by the easily peelable partition wall, filling the chambers with desired contents, and strongly heat welding the peripheral portion of the tubular film. Also, the above container can be obtained by forming the chambers partitioned by the easily peelable partition walls mentioned above, then strongly heat welding the peripheral portion of the film such that a mouth member for filling the contents is inserted in the peripheral portion of the film. Furthermore, the partition wall of the container can also be formed by inserting the easily peelable film or easily peelable laminated film according to the present invention between portions to be a partition wall of a flexible container which is formed of a film not having easy peelability, and heat welding the inserted portions from outside the container.

In order to form easily peelable partition walls using the easily peelable film or easily peelable laminated film according to the present invention, heat welding is performed at a temperature that is higher than a melting point of the polymer having the lowest melting point and lower than the melting point of the polymer having the highest melting point of the polymer mixture which forms the easily peelable film or of the film having peelability in the easily peelable laminated film. More particularly (depending on the components of the resin used, specification of the welding machine, and welding conditions), it is preferred that the low temperature welding is performed at about 130–150° C. As compared with the conventional low temperature welding that has been performed in a narrow temperature range such as 137.5±1° C., when easily peelable partition walls are formed using the film according to the present invention, the temperature range is sufficiently broad that molding failure of the easily peelable partition walls will hardly occur. Low temperature welding under the above conditions can produce easily peelable partition walls having a T-peel strength (as measured by an Instron type universal tester or the like using strap-like test pieces such that the peel angle is 180°) of 0.2–0.6 kg/15 mm (tension speed: 300 mm/minute). The multi-chamber container having the partition walls can be compressed by hand to release, or break the partition walls and allow the plurality of chambers to easily communicate with each other.

On the other hand, to form a peripheral portion of the multi-chamber container that is strongly heat welded, heat welding is performed at a temperature higher than the melting point of the polymer of the mixture having the highest melting point. Specifically, it is preferred that the strong heat welding is performed at 150–220° C.

As the method for heat welding, the same methods as those methods used for welding ordinary olefin type thermoplastic resins such as welding using a hot mold, supersonic welding and high frequency welding, can be used.

The multi-chamber container produced by the above method is subjected to high pressure steam sterilization usually at 110–121° C. after filling the contents in the chambers and sealing. The contents may include not only fluids such as dialysis solutions for artificial kidneys, exchange solutions for filtration type artificial kidneys and infusion preparations, but also powders, solids, etc. The above-described multi-chamber containers undergo no change in the releasability of the easily peelable partition walls or transparency of the container even after sterilization at a temperature of 115° C. or higher.

EXAMPLES

Hereinafter, the present invention will be described in more detail by examples. However, the present invention is not limited to the examples.

The resins used in the examples are shown below. The resins had been molded into pellets before they were used.
PP-A: Propylene/ethylene copolymer
  Ethylene content: 9 mol %
  Tensile modulus: 3,400 kgf/cm$^2$
  Melting point: 121° C.
  Melt flow rate (MFR) (210° C., 2.16 kgf): 2.5 g/10 minutes
PP-B: Propylene/ethylene copolymer
  Ethylene content: 6 mol %
  Tensile modulus: 5,000 kgf/cm$^2$
  Melting point: 143° C.
  MFR (210° C., 2.16 kgf): 2.7 g/10 minutes
PP-C: Propylene homopolymer
  Tensile modulus: 13,500 kgf/cm$^2$
  Melting point: 161° C.
  MFR (210° C., 2.16 kgf): 9.0 g/10 minutes Examples 1–4

Mixtures were prepared by dry blending PP-A and PP-B in a mixing ratio by weight of 2:1 (Example 1), 1:1 (Example 2), and 1:2 (Example 3) and PP-A and PP-C in a mixing ratio by weight of 2:1 (Example 4).

The obtained mixtures were molded into tubular films of 200 μm in thickness and of 200 mm in lay flat width (width of the tubular film when folded flat) using a water cooled inflation film molding machine. The tubular films were cut into portions of a length of 300 mm. Each portion was subjected to low temperature welding at the center across a width of film of 15 mm at a pressure of 5.0 kg/cm$^2$ for 10 seconds at three mold temperatures of 130° C., 140° C., and 150° C. to form partition walls. In each of the chambers in the tubular films formed by the partition walls 200 ml of distilled water was filled and the ends of the chambers were heat welded across a width of 10 mm at a pressure of 5 kg/cm$^2$ for 10 seconds at a mold temperature of 180° C. to seal the tubular film, thus fabricating a multi-chamber container.

Comparative Examples 1 and 2

Multi-chamber containers made of a single layer film of PP-A (Comparative Example 1) and a single layer film of PP-B (Comparative Example 2), respectively, were produced using the same procedures as described in Examples 1–4.

Evaluation of Easily Peelable Films and Multi-chambers
(a) Evaluation of Medical Safety The films obtained in Examples 1–3 were subjected to tests on elutes based on the 13th Revision of Japan Pharmacopoeia, standards of plastic containers for medicines. As a result, all the films were acceptable and showed that they had sufficient safety as medical films.

(b) Evaluation of Tensile Modulus

The films obtained in Examples 1–4 and Comparative Examples 1 and 2 above were cut to mold dumbbell shaped specimens, which were measured for tensile modulus (JIS-K7127) using an Autograph tester (AG-500D, manufactured by Shimadzu Corporation). The results are shown in Table 1.

As will be apparent from Table 1, it is understood that the films according to the present invention and of the Comparative Examples had sufficient flexibility for use in fabricating medical packaging containers.

(c) Evaluation of Light Transmittance

The multi-chamber containers obtained in Examples 1–4 and Comparative Examples 1 and 2 above were subjected to high pressure steam sterilization at 121° C. under a pressure of 1.5 kgf/cm$^2$ for 20 minutes and then to light transmittance at a wavelength of 450 nm in water according to "Test methods for plastic made containers for medicines," 13th Revision of Japan Pharmacopoeia using a spectrophotometer (U-3210, manufactured by Hitachi Ltd.) to evaluate the transparency of the films. The results are shown in Table 1.

As will be apparent from Table 1, each of the multi-chamber containers of Examples 1–4 maintained transparency after the high pressure steam sterilization.

(d) Measurement of T-peel Strength

The easily peelable partition wall portions of the multi-chamber containers obtained in Examples 1–4 and Comparative Examples 1 and 2 and subjected to the high pressure steam sterilization under the above-described conditions were measured for peel strength by a 180° T-peel test at a film width of 15 mm at a test speed of 300 mm/minutes using an Autograph tester (AG-500D, manufactured by Shimadzu Corporation). The results are shown in Table 1.

As will be apparent from Table 1, the multi-chamber containers using the easily peelable films of Examples 1–4, regardless of being welded at a temperature of 130° C., 140° C. or 150°, had excellent peel strength after the high temperature steam sterilization. However, the multi-chamber containers using the film of Comparative Example 1 had high peel strength regardless of the temperature at which they were low temperature welded and the multi-chamber container using the film of Comparative Example 2 showed excellent peel strength only when it was low temperature welded at 150° C., thus showing a narrow temperature range for low temperature welding.

TABLE 1

| | Composition ratio (mixing by weight) | Tensile modulus (kgf/15 mm) | Light transmittance (%) | T-Peel strength (kgf/15 mm) | | |
|---|---|---|---|---|---|---|
| | | | | 130° C. | 140° C. | 150° C. |
| Example 1 | PP-A(2)/PP-B(1) | 1,200 | 75 | 0.58 | 0.60 | 0.50 |
| Example 2 | PP-A(1)/PP-B(1) | 1,300 | 77 | 0.27 | 0.36 | 0.38 |
| Example 3 | PP-A(1)/PP-B(2) | 1,500 | 81 | 0.20 | 0.25 | 0.30 |
| Example 4 | PP-A(2)/PP-C(1) | 1,300 | 78 | 0.42 | 0.46 | 0.43 |
| Comparative Example 1 | PP-A | 1,000 | 83 | 0.75 | 0.77 | 0.77 |
| Comparative Example 2 | PP-B | 1,600 | 72 | 0.13 | 0.22 | |

Advantageous Effects of the Invention

The easily peelable film according to the present invention is a film made of a mixture of a propylene/α-olefin copolymer (A), a propylene/α-olefin copolymer (B) having an α-olefin content different from that of the copolymer (A), and/or a propylene homopolymer (C) and can be low temperature welded by utilizing a difference in melting point therebetween so that partition walls having excellent easy peelability can be formed. Furthermore, the welding temperature range of the film is broader than the conventional temperature range so that there is no fear of causing molding failure of easily peelable partition walls. Sterilization performed at a temperature as high as 115° C. or higher does not result in deterioration of transparency of the film or peel strength of the easily peelable partition walls.

What is claimed is:

1. A film for a medical packaging container comprising a peelable film comprising 90% or more by weight of a mixture of a propylene/α-olefin copolymer (A) and at least one of a propylene/α-olefin copolymer (B) having an α-olefin content different from that of the copolymer (A) and a propylene homopolymer (C), wherein the propylene/α-olefin copolymer (A) has an α-olefin content of 5–20 mol % and a melting point of 110–130° C., the propylene/α-olefin copolymer (B) has an α-olefin content of 8 mol % or less, the propylene/α-olefin copolymer (B) and the propylene homopolymer (C) each have a melting point of 130–170° C., and a difference between the melting point of (A) and the melting point of (C) is each at least 5° C. and wherein the α-olefin in the propylene/α-olefin copolymer (A) and the α-olefin in the propylene/α-olefin copolymer (B) are α-olefin having 2 or 4 to 8 carbon atoms.

2. The film for a medical packaging container claimed in claim 1, wherein the film is tubular.

3. The film for a medical packaging container claimed in claim 1, wherein the film is a plain monolayer film.

4. A laminated film for a medical packaging container comprising a peelable laminated film, wherein said peelable laminated film comprises, as a surface layer, a film comprising 90% or more by weight of a mixture of a propylene/α-olefin copolymer (A) and at least one of a propylene/α-olefin copolymer (B) having an α-olefin content different from that of the copolymer (A) and a propylene homopolymer (C), wherein the propylene/α-olefin copolymer (A) has an α-olefin content of 5–20 mol % and a melting point of 110–130° C., the propylene/α-olefin copolymer (B) has an α-olefin content of 8 mol % or less, the propylene/α-olefin copolymer (B) and the propylene homopolymer (C) each have a melting point of 130–170° C., and a difference between the melting point of (A) and the melting point of (C) is each at least 5° C. and wherein the α-olefin in the propylene/α-olefin copolymer (A) and the α-olefin in the propylene/α-olefin copolymer (B) are α-olefin having 2 or 4 to 8 carbon atoms.

5. The laminated film for a medical packaging container claimed in claim 4, wherein the laminated film is tubular.

6. The laminated film for a medical packaging container claimed in claim 4, wherein the laminated film is a plain multilayer film.

7. The laminated film for a medical packaging container claimed in claim 4, wherein the laminated film is a lid material for an easily peelable container.

8. The laminated film for a medical packaging container claimed in claim 4, wherein the laminated film is a sealing film for rubber stopper caps of an infusion bag.

* * * * *